United States Patent Office 3,496,014

Patented Feb. 17, 1970

3,496,014

METHOD OF CONTROLLING THE MAGNETIC CHARACTERISTICS OF AN ELECTROLESSLY DEPOSITED MAGNETIC FILM

Herman Koretzky and Arnold F. Schmeckenbecher, Poughkeepsie, N.Y., assignors to International Business Machines Corporation, Armonk, N.Y., a corporation of New York No Drawing. Filed July 15, 1966, Ser. No. 565,385

Int. Cl. B32b *15/00;* C04b *35/00*

U.S. Cl. 117—235 1 Claim

ABSTRACT OF THE DISCLOSURE

Controlling the magnetic characteristics of an electrolessly deposited magnetic film by varying the co-deposition ratio of nickel and iron comprising providing a catalytic surface on which the magnetic film is to be deposited, and contacting the catalytic surface with an electroless bath comprising water soluble salts of nickel and iron, an electroless reductant for the salts and a complexing agent mixture of a tartrate and a lactic acid, the molar ratio of said tartrate to said lactic acid being from about 2:1 to about 1:2. The mixture is present in an amount of from about .05 to about 1 mole per liter of the bath.

The present invention relates to a method and composition for controlling the magnetic characteristics of electrolessly deposited films.

In recent years, the electroless deposition of metals onto catalytic surfaces has become a widely used industrial process. The technique has been employed to deposit a number of metals on substantially non-conductive substrates. This aspect of the process has been successfully applied in the production of conductive and magnetic films on insulating substrates, such as glass, plastic and paper, and has been a valuable tool in the manufacture of electrical devices, including printed circuit boards, magnetic tapes and the like.

In the co-deposition of magnetic metals onto a catalytically prepared surface, it has been found that the rate of deposition and the ratio of the metals deposited is dependent on many factors. In order to obtain useful magnetic films with reproducible characteristics, it has been necessary to go through an extensive optimization procedure and finally to exercise rigorous control of the conditions during deposition. For example, having determined the desired geometries and magnetic characteristics for an end product, an extensive period of trial and error would be entered to determine the types of materials to be used, the concentrations of the electroless bath constituents, temperature and pH of the bath, period of contact between the substrate and the bath, etc. Variations of the magnetic characteristics of the resulting films could only be achieved by varying one or more of the deposition parameters. This, however, would result in films with unpredictable properties due to the fact that the change of one deposition parameter would frequently introduce many other changes into the overall system. In other words, although only one bulk parameter would seem to be varied, a number of other variations, such as change in ionic strength, would be introduced.

The standard complexing agent most widely used in electroless plating is the tartrate radical, usually employed as Rochelle salts or sodium-potassium tartrate. When used in the electroless co-deposition of iron and nickel magnetic films, the tartrate yields useful films. However, the nickel/iron ratio in the film is rather narrowly defined, i.e., using this complexing agent there is little flexibility in the nickel/iron ratio and related magnetic characteristics which can be obtained from such a system.

Therefore, the primary object of the present invention is to provide a method and composition by which magnetic films of controlled characteristics may be electrolessly deposited on suitably prepared catalytic surfaces.

A further objective of the invention is to provide a method and composition which will permit the rate of electroless deposition and the ratio of co-deposited magnetic metals in the resulting film to be controlled without making adjustments in the electroless system which markedly change the ionic strength of the solution.

Another object of the present invention is to provide a method and composition for controlling the characteristics of magnetic films electrolessly formed by the co-deposition of magnetic metals without the necessity of utilizing control mechanisms, such as variation of reductant concentration, temperature or pH.

The foregoing objectives and many other highly desirable advantages are achieved in accordance with the present invention which generally comprises providing a catalytic surface on which the magnetic film is to be deposited, contacting the catalytically prepared surface with an electroless bath comprising salts of nickel and iron to be co-deposited, an electroless reductant for the metal salts, and a complexing agent having a greater or lesser affinity for one of the metals than does the standard tartrate complexing agent, and electrolessly co-depositing the magnetic metals from the bath onto the surface. In this manner, there may be formed a magnetic film which has a nickel/iron ratio which varies substantially from the ratio obtained by depositing the film from the same bath containing the tartrate complexing agent.

The invention also contemplates electroless baths for depositing magnetic films of controlled characteristics onto a catalytic surface. The electroless bath of the invention comprises an aqueous solution containing salts of the magnetic metals which are to be co-deposited, an electroless reductant for the metal salts and a complexing agent selected from the group consisting of citrate, succinate, malonate and lactate radicals.

The complexing agents of the present invention have the following effect on the nickel/iron ratio of electrolessly co-deposited magnetic films, as compared with the standard tartrate complexing agent:

| | |
|---|---|
| Citrate | ↑ |
| Succinate | |
| Tartrate (standard) | Order of increasing nickel/iron ratio |
| Malonate | |
| Lactate | |

The complexing agents selected from the group consisting of citrate, succinate, malonate and lactate may be used singly or in combination to replace all or part of the tartrate in a standard bath to obtain nickel-iron magnetic films of varied metal content and magnetic properties.

Useful films deposited from the solutions of the invention will generally have a composition on the order of from 62% Ni, 37% Fe, 1% P to 90% Ni, 9% Fe, 1% P. Thus the nickel/iron ratio in such films is from about 6/4 to about 10/1.

An amount of complexing agent in the range of from about 0.5 to 1.0 mole/liter is effective for the purpose of the invention.

In preparing the electroless baths of the invention, the sulfates, chlorides or other salts of the metals may satisfactorily be employed in the method and compositions.

A number of electroless reductants for the above salts are available and include, for example, hypophosphites, dimethylamine borane, hydrazine or mixtures of these materials.

As for the complexing agent, it has been found that a nickel-iron system, the citrate ion has a preferential affinity for $Fe^{++}$ and yields magnetic films having a greater nickel to iron ration than is ordinarily obtained under the same deposition conditions. Further, by the use of complexing agents which preferentially complex with the iron, but less strongly than does the citrate ion, the nickel to iron ratio in the final film can be decreased. For example, the malonate and succinate ions complex with iron but less strongly than does the citrate ion, producing films having a higher iron content than is found when the citrate complexing ion is employed. Similarly, by incorporating complexing agents which preferentially complex with the nickel ion, the nickel content of the magnetic film can be likewise varied. Nickel complexing agents include, for example, ammonia, triethanolamine, glycine, trimethylamine, ethylenediaminetetra-acetic acid, etc.

The invention will be better understood in the light of the following examples, illustrating preferred embodiments of the invention.

EXAMPLE 1

A plating solution was prepared by dissolving 21.7 millmoles of sodium hypophosphite, 56.2 millimoles nickelous chloride, 9 millimoles ferrous ammonium sulfate, 115 millimoles sodium potassium tartrate and 3600 millimoles ammonia in one liter of water. The plating solution was placed in a glass beaker and covered with a layer of xylene. Silicone oil may also be used in place of xylene. The plating solution was heated to 65° C. and left at that temperature in a constant temperature bath.

A circular sheet of hardened beryllium-copper of about .003" thickness and 1" diameter was cleaned by the usual dips in 10% hydrochloric acid or similar acid solutions, rinsed in distilled water and dipped into an 0.1% palladium chloride solution for 5 seconds, rinsed and put into the above plating solution at 65° C. for 80 min.

A deposit of 24,000 A. thickness was formed. It contained 29% iron, about 1% phosphorous, and about 69% nickel.

EXAMPLE 2

A similar plating solution was prepared as in Example 1 which in addition to the above-mentioned reagents contained 20 millimoles/1 malonic acid. A deposit was plated as decribed. The deposit contained 31.3% Fe.

EXAMPLE 3

A similar plating solution was prepared, which in addition to the above-mentioned reagents contained 100 millimoles/1 malonic acid. The deposit plated from this bath contained 35% Fe.

EXAMPLE 4

A plating solution was prepared, as in Example 1, which contained 44 millimoles sodium hypophosphite, 56.2 millimoles nickelous chloride, 12 millimoles ferrous ammonium sulfate, 67 millimoles sodium potassium tartrate, 33 millimoles lactic acid and 3600 millimoles ammonia in one liter of water.

A sheet of beryllium-copper was plated as described in Example 1. The deposite contained 30.7% iron.

EXAMPLE 5

A plating bath was prepared and employed, as in Example 4, but the bath contained 33 millimoles sodium potassium tartrate, and 67 millimoles lactic acid. In this case the deposit contained 31.4% iron.

EXAMPLE 6

A plating solution was prepared by dissolving 28.2 millimoles dimethylamine borane, 56.2 millimoles nickelous sulfate, 6.0 millimoles ferrous ammonium sulfate, 115 millimoles sodium potassium tartrate and 3600 millimoles ammonia in one liter of water.

An active solid substrate was plated at 65° C. as described in the preceding examples.

The deposit formed contained 25.0% Fe, about 1% boron and about 73% nickel.

EXAMPLE 7

The sodium potassium tartrate of Example 6 was replaced by 115 millimoles of sodium citrate. The deposit formed in a similar manner contained 20.5% Fe.

EXAMPLE 8

The sodium potassium tartrate of Example 6 was replaced by 115 millimoles of malic acid, the deposit formed in a similar maner contained 33.4% Fe.

EXAMPLE 9

The sodium potassium tartrate was replaced by 115 millimoles of lactic acid. The deposit formed in a similar manner contained 42.3% Fe.

The present invention may be varied in details, as will be appreciated by those skilled in the art, without departing from the spirit or scope of the invention.

What is claimed is:

1. A method for controlling the magnetic characteristics of an electrolessly deposited magnetic film formed by the co-deposition of nickel and iron by controlling the nickel/iron ratio in the deposited film, comprising:

providing a catalytic surface on which said magnetic film is to be deposited, contacting said catalytic surface with an electroless bath comprising water soluble salts of nickel and iron, an electroless reductant for said salts, water, and a complexing agent mixture consisting of a tartrate compound and a lactic acid, said tartrate compound and said lactic acid being dissolved in said water, the molar ration of said tartrate compound to said lactic acid being from about 2:1 to about 1:2, said complexing agent mixture being present in a total amount of from about .05 to about 1 mole per liter of said bath to yield a final nickel/iron ratio within the range of from about 6/4 to about 10/1, and electrolessly co-depositing said nickel and said iron from said bath onto said surface to form a magnetic film which has the desired nickel/iron ratio.

References Cited

UNITED STATES PATENTS

| | | | |
|---|---|---|---|
| 3,305,327 | 2/1967 | Schmeckenbecher | 117—236 |
| 3,350,210 | 10/1967 | Schmeckenbecher | 117—236 |
| 3,360,397 | 12/1967 | Koretzky | 117—47 X |
| 3,370,979 | 2/1968 | Schmeckenbecher | 117—236 |

WILLIAM D. MARTIN, Primary Examiner

B. D. PIANALTO, Assistant Examiner

U.S. Cl. X.R.

117—130, 160, 236, 240